United States Patent
Schaefer et al.

(10) Patent No.: US 6,785,806 B1
(45) Date of Patent: Aug. 31, 2004

(54) BIOS HAVING MACRO/EFFECTOR PAIRS FOR HARDWARE INITIALIZATION

(75) Inventors: Joseph A. Schaefer, Olympia, WA (US); Michael F. Kartoz, Tumwater, WA (US); Robert L. Huff, University Place, WA (US); Kimberly A. Davis, University Place, WA (US); Kirk Brannock, Olympia, WA (US); Donald Hewett, University Place, WA (US); Daniel A. Rich, Olympia, WA (US); William J. Chalmers, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/515,464

(22) Filed: Feb. 29, 2000

Related U.S. Application Data

(63) Continuation-in-part of application No. 09/475,650, filed on Dec. 30, 1999, now abandoned.

(51) Int. Cl.$^7$ .............................................. G06F 15/177
(52) U.S. Cl. ............................... 713/2; 713/1; 711/103
(58) Field of Search .......................... 713/1, 2; 711/103

(56) References Cited

U.S. PATENT DOCUMENTS

| | | | |
|---|---|---|---|
| 4,928,237 A | 5/1990 | Bealkowski et al. ........ 713/100 |
| 5,113,512 A | 5/1992 | Miki et al. |
| 5,247,659 A | 9/1993 | Curran et al. |
| 5,355,489 A | 10/1994 | Bealkowski et al. |
| 5,519,843 A | 5/1996 | Moran et al. |
| 5,615,331 A | 3/1997 | Toorians et al. |
| 5,768,568 A | 6/1998 | Inui et al. ..................... 710/16 |
| 5,835,594 A | 11/1998 | Albrecht et al. |
| 5,930,504 A | 11/1998 | Gabel |
| 5,860,083 A | 1/1999 | Sukegawa |
| 5,937,434 A | 8/1999 | Hasbun et al. |
| 5,974,546 A | 10/1999 | Anderson |
| 6,018,806 A | 1/2000 | Cortopassi et al. |
| 6,026,402 A | 2/2000 | Vossen et al. |
| 6,032,239 A | 2/2000 | Beelitz |
| 6,101,601 A | 8/2000 | Matthews et al. |
| 6,119,131 A | 9/2000 | Cabrera et al. |
| 6,138,239 A | 10/2000 | Veil |
| 6,148,441 A | 11/2000 | Woodward |
| 6,185,678 B1 | 2/2001 | Arbaugh et al. |
| 6,192,471 B1 | 2/2001 | Pearce et al. |
| 6,256,031 B1 | 7/2001 | Meijer et al. |
| 6,308,264 B1 | 10/2001 | Rickey |

(List continued on next page.)

FOREIGN PATENT DOCUMENTS

| | | |
|---|---|---|
| JP | 411039152 A | 2/1999 |
| JP | 411306007 A | 11/1999 |

OTHER PUBLICATIONS

"Computer Address Resolution Across 64K Boundaries", IBM TDB, Jan. 1988, vol. 30, p. 113.

Dirk Desmet, "Efficient Assembly Code Generation for Digital Signal Processors Starting from a Data Flowgraph", IEEE 1993, pp. 45–48.

Jerry Jex, *Flash Memory BIOS for PC and Notebook Computers*, May 9–10, 1991, pp. 692–695.

Primary Examiner—Thomas Lee
Assistant Examiner—Chan Cao
(74) Attorney, Agent, or Firm—Blakely, Sokoloff, Taylor & Zafman LLP

(57) ABSTRACT

A BIOS having a set of effectors to initialize harware within the system. The BIOS having a set of macros, each macro of the set of macros having a reference to an effector of the set of effectors, each macro of the set of macros having a set of arguments.

17 Claims, 6 Drawing Sheets

U.S. PATENT DOCUMENTS

| | | |
|---|---|---|
| 6,308,265 B1 | 10/2001 | Miller |
| 6,378,128 B1 | 4/2002 | Edelstein et al. |
| 6,392,925 B2 | 5/2002 | Jha et al. ............... 365/185.04 |
| 6,401,202 B1 | 6/2002 | Abgrall |
| 6,401,208 B2 | 6/2002 | Davis et al. |
| 6,418,449 B1 | 7/2002 | Chen et al. ............... 707/104.1 |
| 6,430,481 B1 | 8/2002 | Lovelace, II et al. |
| 6,446,201 B1 | 9/2002 | Gunther |
| 6,510,512 B1 | 1/2003 | Alexander ..................... 713/2 |
| 6,629,192 B1 * | 9/2003 | Schaefer et al. ............ 711/103 |

* cited by examiner

BIOS HAVING MACRO/EFFECTOR PAIRS FOR HARDWARE INITIALIZATION

This application is a Continuation-in-part of U.S. application Ser. No. 09/475,650, filed Dec. 30, 1999 now abandoned.

BACKGROUND OF THE INVENTION

1. Field of the Invention

The invention generally relates to methods for programming and more particularly relates to programming a BIOS (Basic Input/Output System) or in a system with highly restricted system resources.

2. Description of the Related Art

When a computer system starts up, typically it first runs instructions on the processor(s) which are stored in a BIOS (Basic Input/Output System). These instructions may initialize the system and may help the system determine how it is configured and how it may operate. Due to the state of the system at the time, the instructions in the BIOS are typically restricted to instructions that can be run solely on the processor. The system may have random access memory installed, but that fact needs to be discovered by the processor before the random access memory may be used, so until the presence and configuration of random access memory has been established, the processor must not execute instructions that use random access memory. As a result, code written in high-level languages such as C may not be used to directly implement the instructions in the BIOS until memory is configured for proper system operation. In particular, no code which uses a stack for passing procedure/function calls and arguments may be used, as a stack is typically allocated in system memory. The only memory available is that in the BIOS (which is usually FLASH ROM and therefore unsuitable for temporary storage) and memory contained within the processor (typically registers). Furthermore, the memory used is relatively expensive, so the more of it that is used, the more expensive the system becomes.

This startup environment is highly restricted as described, but also does not demand sophisticated programs. The contents of the BIOS are fairly simple routines for determining if memory (such as random access memory) is included in the system, where any included memory is in the physical addressing space, what other peripheral devices are attached to the system, and whether any malfunctions are occurring. Unfortunately, if there is a problem in the BIOS code itself, that is very difficult to find, as the traditional debugging techniques such as observing messages on a screen from embedded parts of code or reading a file containing a step-by-step description of what processing occurs are not available when running BIOS code under startup conditions. Traditional debugging techniques require system resources that the BIOS code must initialize, and those system resources may not be used without first undergoing initialization. If a BIOS in a system that is out in the public fails, chances are that either the system will fail to start properly, leaving it wholly nonfunctional, or it will have some sort of intermittent error due to a relatively minor bug in the BIOS which only affects a non-critical portion of the system. In either case, those attempting to isolate and fix the error will often have tremendous difficulty isolating the error.

The BIOS code is typically written in assembly language, written at a low enough level that an assembler may easily convert it to native instructions for a processor (machine language). At this level, code is typically written such that if a procedure or function call is specified, rather than having the code jump to the procedure or function, the code for the procedure or function is inserted at the point where the procedure or function call was specified. This results in duplicated procedure or function code and larger than necessary code size. It also makes debugging the code difficult, as it does not exactly correspond to what was written prior to assembly of the code. Furthermore, much of the code may be devoted to moving operands into specific registers for purposes of the procedure or function execution, then moving the operands back to where the operands came from. Moreover, these operands are often parameters that are not varied within the procedure or function, they are simply necessary as reference values for the execution of the procedure or function.

One alternative to this coding scheme is use of a table of function calls which may be executed sequentially. In that case, the function calls are not replaced by the actual function code, so debugging is somewhat easier. However, tables typically must have all entries identical in size, which means that each entry must have a place for the information necessary in all other entries. This results in a table wherein most of the entries use only a small portion of the total memory allocated to each entry, and therefore results in significantly larger than desired code. Furthermore, the developer of the table is in a position to make many simple mistakes due to the complexity of maintaining a large and unwieldy table of entries. Additionally, some sort of engine must be written to sequence through the table, and that engine will require even more code to implement.

SUMMARY OF THE INVENTION

The invention, in one embodiment, is an apparatus. The apparatus includes an effector having executable code. The apparatus also includes a macro having a reference to the effector.

BRIEF DESCRIPTION OF THE DRAWINGS

The present invention is illustrated by way of example and not limitation in the accompanying figures.

DETAILED DESCRIPTION

A method and apparatus for making and using interpretive macro/effector pairs for hardware initialization is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. It will be appreciated that the term memory need not refer only to random access memory.

Figure 1:
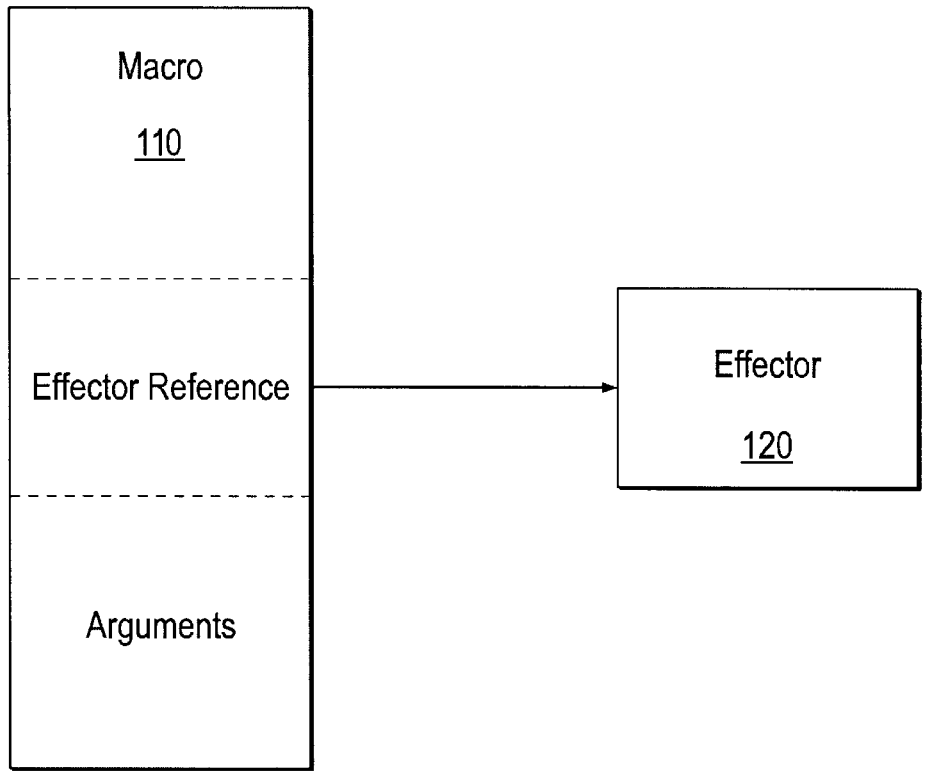
FIG. 1 illustrates an embodiment of a macro and effector pair.

Illustrated in FIG. 1 is the basic relationship between a macro 110 and an effector 120. Note that the term macro here does not refer to the more generic definition of a macro within assembly language programming, wherein it is typically a shorthand reference to a piece of code that may be located by an assembler. The macro 110 and effector 120 are linked by a reference within the macro 110 to the effector 120. The macro 110 is composed of a reference to the effector 120 and a series of arguments or parameters provided for use by the effector 120. The effector 120 is composed of code designed to implement a function or perform a series of steps on a processor.

In one embodiment, the macro 110 contains a pointer to the effector 120 which is used to jump to the effector. The macro 110 also contains the parameters the effector 120 will use. The effector 120 may use a predetermined mechanism to trace back to the macro (such as macro 110) and its parameter list. In one embodiment, effector 120 may use a register (such as the ESI register in an Intel™ microprocessor for example) for a pointer to the location of the macro 110. The effector 120 is written with an assumption about the size and shape of the referencing macro (such as macro 110) and the organization of the parameters within the referencing macro. As a result, the effector 120 may access each parameter within the macro 110 by using a predetermined offset to the pointer to the location of the macro 110. Thus, the effector 120 may access the parameters within the macro 110 without the additional effort of moving those parameters into registers or other storage, and need not utilize the stack necessary in higher-level language procedure/function calls.

Effector 120 and effectors in general may be arbitrarily complex. There is no inherent limit on the size of an effector beyond limits due to system resources. Furthermore, effector 120 may include multiple macros or other references to other effectors, such that an effector may be thought of as nested within another effector in terms of execution.

Figure 2:
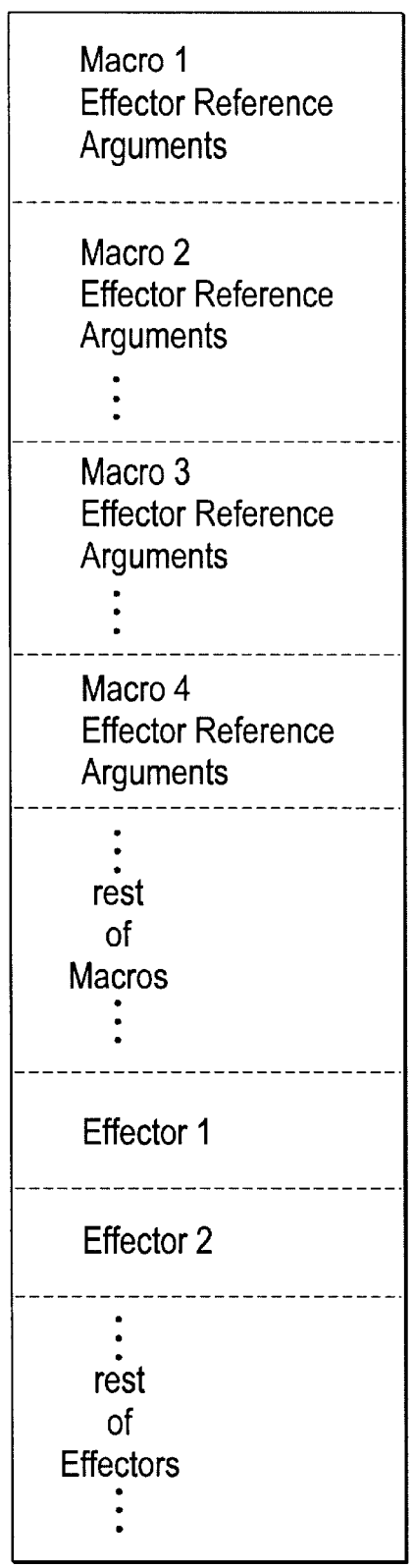
FIG. 2 illustrates an embodiment of an organization of macros and effectors.

Turning to FIG. 2, an embodiment of an organization of macros and effectors is illustrated. Macros are arranged in sequence within memory, starting with macro 1, then macro 2, then macro 3, then macro 4, followed by remaining macros. Following the end of the macros, the effectors are arranged in memory starting with effector 1, followed by effector 2, and followed by the remaining effectors. While this arrangement is relatively simple, it will be appreciated that this arrangement may be used to organize 512 kB or 1 MB of macro-effector code, so it can be a powerful tool.

It will be appreciated that alternative arrangements and organizations of the macros and effectors may be used. Effectors need not be in sequential order or in contiguous spaces within memory. Macros need only be in sequential order if the method of executing the macros imposes such constraints, for example when macros are executed as entries in a table. It will be appreciated that macros may further include an item such as a next pointer which points to the memory location where the macro to be executed next exists. Furthermore, it will be appreciated that including multiple next pointers may be suitable for implementing a conditional branching scheme.

Macro 1 is composed of a reference to an effector such as effector 1, followed by the arguments for use by the effector referenced. Macro 2 is composed of a reference to an effector, which may be effector 2 for example, and followed by the arguments for use by the effector referenced. Macro 3 is again composed of the effector reference and arguments for that effector. Macro 4 is likewise composed of an effector reference and argument for use by that effector. Following macro 4 is the rest of the macros, each composed of an effector reference and argument(s). It will be appreciated that multiple macros in the group or list of macros may refer to the same effector, with the same argument structure, such that the effector code is effectively reused.

Following the last of the macros is effector 1, which contains the code that actually executes the function of the effector. This code is designed to use a predetermined number of parameters of a predetermined size or sizes, which may be found within the macro used to execute effector 1. Following effector 1 is effector 2 which is similarly designed to use a predetermined number of parameters of a predetermined size or sizes, which may be found within the macro used to execute effector 2. Following effector 2 are the other effectors necessary to execute the functions of the program or BIOS. As will be appreciated, in one embodiment the execution of the macro-effector pairs begins with locating macro 1, extracting the pointer (or other reference) to its corresponding effector (such as effector 1 for example), and then jumping to the corresponding effector. Execution then proceeds by executing the effector corresponding to macro 1, and then to execution of the effector corresponding to macro 2 (such as effector 2 for example), then to execution of the effector corresponding to macro 3, then to execution of the effector corresponding to macro 4, and so on. The ordering of the macros, in one embodiment, determines the order of execution of the effectors, even though the macros themselves may not be executed. In the process, an efficient BIOS may be formed and utilized, which does not duplicate as much code as a BIOS using inline functions and does not waste the argument space consumed in a table of fixed argument size and number. Note that a processor may easily jump from one memory location to another, particularly when the branches are unconditional as they typically are in macro-effector pairs.

It will be appreciated that a macro and effector make a matched pair, and that for this reason the arguments may exist in the macro and be utilized by the effector. The argument definition and implementation of the macro and effector must match. However, it will also be appreciated that multiple instances of a macro may refer to the same instance of an effector, and that the different instances of the macro may include different arguments and/or different next pointers for example. Likewise, a macro and an effector need not be in contiguous memory to function as a matched pair.

It will also be appreciated that the form of the macro-effector pairs makes changes and debugging easier than debugging was in prior art systems. For example, each effector may be modified or debugged in relative isolation, without concern for whether proper inline code is being generated or whether entries in a table for calling routines are correct. Likewise, each instance of a macro used to execute a given effector has an identical form, with variation occurring only in the arguments passed to the effector. In one embodiment, all effectors have freedom to modify any register in the processor to be initialized, so no constraints are maintained on any variables except for those contained within the macro, thus narrowing the alternatives for location of problems to the effector and corresponding instances of macros that a developer is attempting to finish or debug.

Furthermore, it will be appreciated that the macros and effectors may be generated automatically in a straightforward manner, and that this may lead to enhanced flexibility in use of macros and effectors. For example, once a set of effectors have been designed, they may be stored in an accessible but preferably persistent storage medium. Likewise, a set of macros appropriate for calling the effectors of the set of effectors may be designed and similarly stored in a persistent storage medium. The effectors may be treated as primitives, or building blocks suitable for use in building up a BIOS or an initialization routine for a system for example.

In one embodiment, several sets of macros may be implemented in a BIOS in a static manner (that is to say in a manner resulting in a BIOS which is unlikely to rewrite itself), and a determination of which set of macros to use for initializing the surrounding system may be made based on what is discovered about the system. Each set of macros may be created relatively easily, as compared to writing all of the code for the BIOS, and to some degree the macros may be generated automatically.

In an alternate embodiment, a general purpose BIOS initialization routine may be included in the BIOS when it is created. Included in this routine are macros and effectors which may generate sets of macros in a dynamic manner. In one embodiment, the macros are generated based on the state of the system after initialization has occurred, are initially stored in RAM, and are then written into some form of persistent storage or memory. The persistent memory may be the same memory used for the original BIOS, such as a portion of the memory which is intended to store a custom startup/initialization routine for a surrounding system. The general purpose BIOS initialization routine may then be modified to utilize the set of macros generated dynamically as the custom initialization routine.

In one embodiment, this custom routine is executed after the general purpose routine determines that the configuration of the surrounding system is unchanged. In an alternate embodiment, the custom routine includes macros which cause the processor to determine whether the configuration of the surrounding system has changed, and automatically jump back to the general purpose routine if a change is detected.

In the dynamic case, the set of macros may be tuned through ordering and use of arguments or parameters to efficiently configure the system logically to reflect its physical configuration. Moreover, the set of macros may be generated automatically by the general purpose routine, based on the results of the configuration by the general purpose routine. It will be appreciated that the custom routine may be limited to components of a system that are likely to change on very rare occasions, such as internal memory (random access) or it may be expanded to handle other portions of the system such as components connected to a PCI Bus, for example.

Furthermore, it will be appreciated that in initializing most computer systems, the configuration of the system does not change from one initialization to the next initialization, as components that were connected at one time are often still connected at a later time, and adding or removing random access memory is likewise a rare event for a system. Thus, the custom initialization routine may be said to be optimized for a stable system. Also, the ability to perform conditional branching during use of macros and effectors is inherent in the above discussion. However, it will be appreciated that performance of conditional branching is not ruled out by use of macros and effectors. Moreover, it will be appreciated that a macro may have both an argument containing a reference to the next macro and also an argument containing a reference to an alternate macro in case of a branch, or the macro may contain just the reference to the alternate macro, with the reference to the next macro implied in a register such as a program counter for example.

Figure 3:
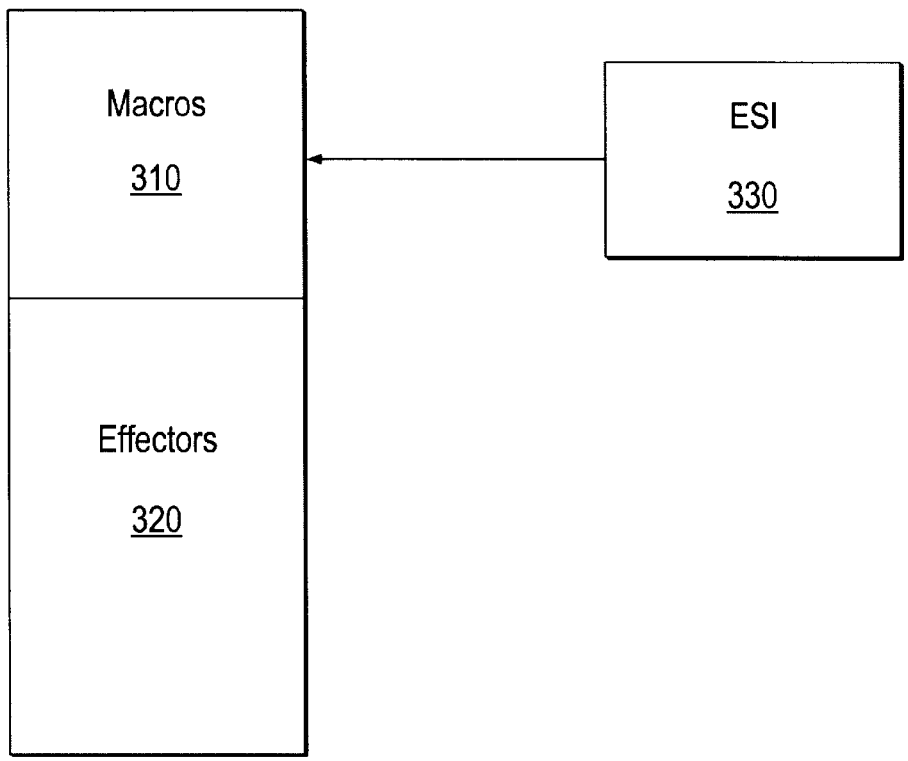
FIG. 3 illustrates an embodiment of an organization of macros and effectors in conjunction with an ESI register.

Turning to FIG. 3, an alternative embodiment of an organization of macro-effector pairs is illustrated. In this embodiment, macros 310 are the macros containing references to effectors 320 and arguments for use by effectors 320. ESI 330 is the esi register of the 80×86 architecture family offered by the Intel™ corporation. ESI 330 is used as a pointer into the macro 310 space. ESI 330 contains the location of the macro in macros 310 which is currently being executed by the processor. The corresponding effector may then find the arguments in the macro by indexing from the value in ESI 330. When the effector completes execution, the effector may also increment ESI 330 to point to the next macro in macro table/list 310, as the effector may contain an increment value corresponding to the size of a macro suitable for executing the effector.

Figure 4:
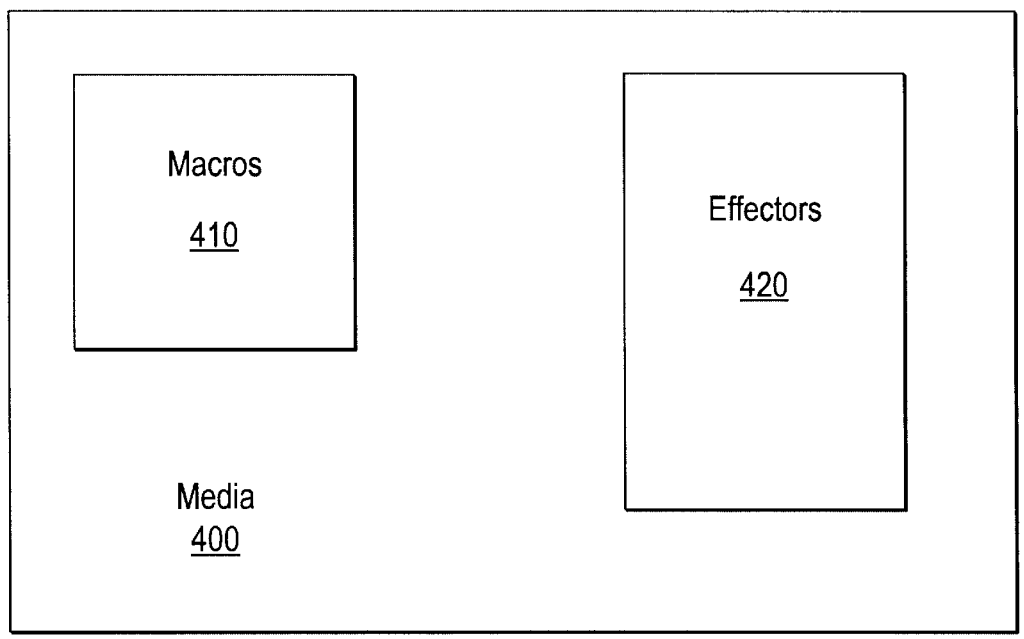
FIG. 4 illustrates an embodiment of a medium or media embodying macros and effectors.

Turning to FIG. 4, a medium or media embodying the macro-effector pairs is illustrated. Media 400 may be a RAM or ROM memory such as the FLASH ROM discussed previously, or media 400 may be some form of magnetic memory such as a disk or tape. Likewise, media 400 may be optical media such as a CD or DVD, or media 400 may be a carrier wave or other media capable of embodying instructions. Embodied within media 400 are macros 410 an effectors 420. Macros 410 may correspond to the macros 310 of FIG. 3 for example, or may correspond to macros suitable for use in a device having only a BIOS. Likewise, effectors 420 may correspond to effectors 320 of FIG. 3 for example, or may correspond to effectors otherwise suitable for use with macros 410.

Figure 5:
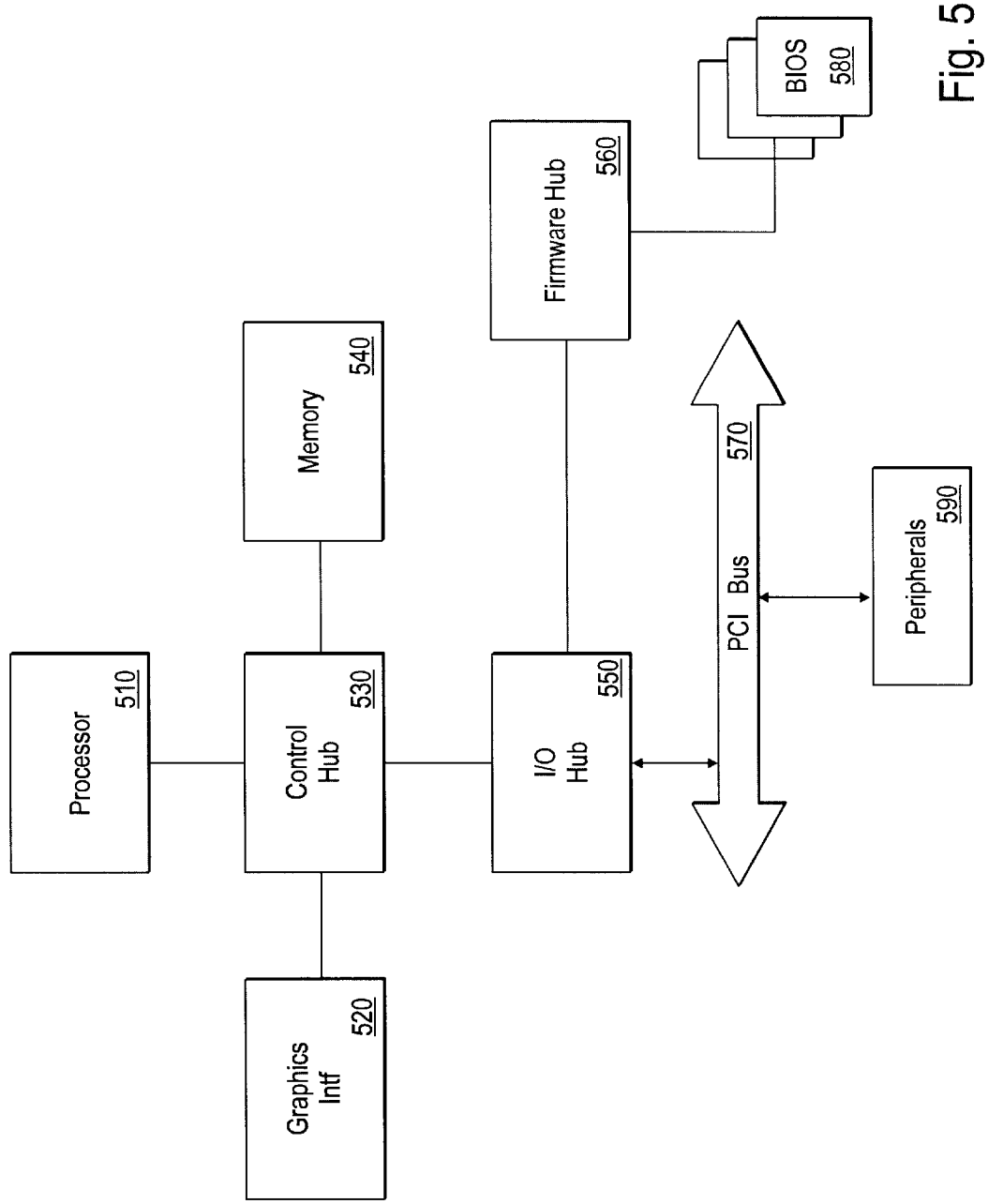
FIG. 5 illustrates an embodiment of a system which may use macros and effectors.

Turning to FIG. 5, a system suitable for use with the macro-effector pairs is illustrated. Processor 510 is coupled to control hub 530. Control hub 530 is coupled to memory 540, to I/O hub 550, and to graphics interface 520. I/O Hub 550 is coupled to firmware hub 560, which in turn is coupled to BIOS 580. I/O Hub 550 is also coupled to PCI bus 570, which in turn is coupled to peripherals 590. It will be appreciated that many other systems may have different arrangements of different components and still be suitable for use with the macro-effector pairs.

In one embodiment, BIOS 580 contains macro-effector pairs which execute the startup functions of the system, and may find and initialize the control hub 530, the memory 540, the I/O hub 550, the PCI bus 570, the peripherals 590, and the graphics interface 520. Alternatively, BIOS 580 may contain macro-effector pairs which cause processor 510 to find control hub 530, and then cause processor 510 to cause control hub 530 to find and initialize the rest of the system.

In one embodiment of a system utilizing a BIOS, the BIOS creates a machine initialization table once memory is available in the system. The machine initialization table, in one embodiment, contains macros with parameters which are tuned to reflect a current machine state such that a subsequent reset of the machine can execute these macro-effector pairs to achieve that same state again. In one embodiment, this machine initialization table is created through execution of macro-effector pairs after execution of the BIOS routines has reached a point where writeable memory is available. It will be appreciated that the machine initialization table may be implemented as a list of macros with references to effectors, thus allowing a machine to sequence through the macros to determine the startup state of the machine.

Figure 6:
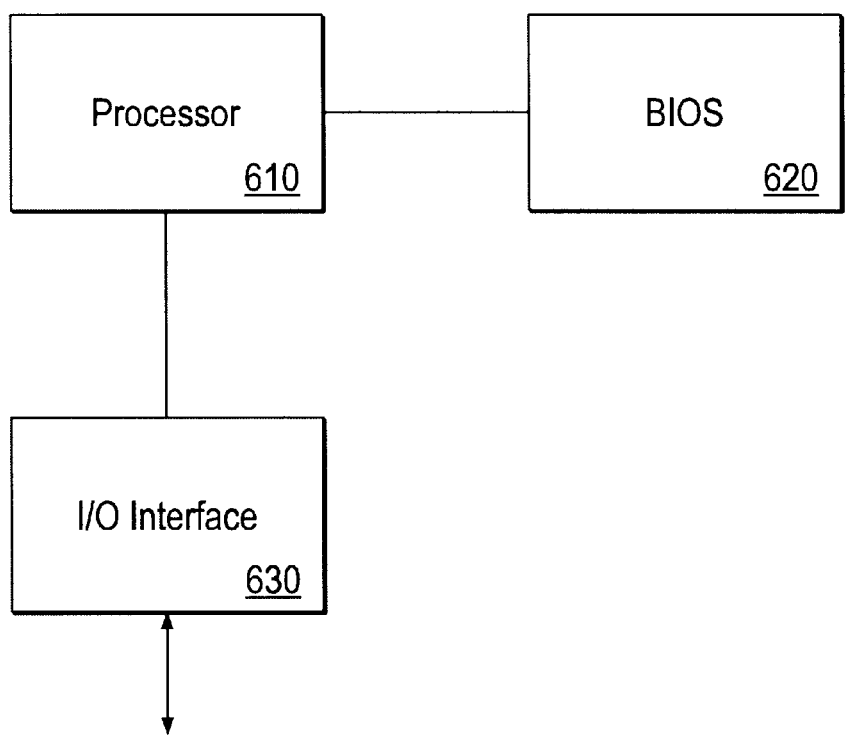
FIG. 6 illustrates an alternate embodiment of a system which may use macros and effectors.

Illustrated in FIG. 6 is an alternate embodiment of a system suitable for use with the macro-effector pairs. Processor 610 is coupled to BIOS 620 and to input/output interface 630. BIOS 620 contains macro-effector pairs which may initialize and control the system. Processor 610, executing the macro-effector pairs, controls input/output interface 630, which may sample sensors or otherwise interact with the surrounding environment, and send out control signals or otherwise communicate with whatever is connected to the system. In this manner, only the memory for storing the macro-effector pairs is necessary for the system, as the macro-effector pairs need not use other system memory beyond the registers native to the processor 610.

While the previous discussion has included a BIOS, it will be appreciated that presence of a BIOS is not necessary for the invention. In particular, it will be appreciated that any machine initialization code may be implemented in the manner described above, and that this type of code may be used when operation utilizing a minimum of system resources is desired. Thus, macros and effectors may be implemented in systems which do not include a BIOS, and they may be implemented without the constraints present when a computer system is initially started. Macros and effectors are not defined to operate only within a system with minimal resources, such as a computer system at startup. Rather, macros and effectors are capable of operating under such conditions.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An apparatus comprising:
a basic input/output system (BIOS) routine having a set of effectors having executable code, and a set of macros, with each macro
a referencing at least one effector, each macro having at least one argument, the macros when executed dynamically generating additional macros based on a state of a system after initialization has occurred, the additional macros to be stored in a non-volatile memory.

2. The apparatus of claim 1 further comprising:
a second effector having executable code; and
a second macro having a reference to the second effector.

3. The apparatus of claim 2 wherein:
the second macro has a set of arguments.

4. The apparatus of claim 2 further comprising:
a third macro having a reference to an effector.

5. The apparatus of claim 4 wherein:
the reference of the third macro referring to a first effector.

6. The apparatus of claim 4 further comprising:
a third effector having executable code; and wherein
the reference of the third macro referring to the third effector; and
each of a first macro, the second and the third macro having a pointer to a next macro.

7. A method comprising:
executing a basic input/output system (BIOS) having a set of effectors having executable code, and a set of macros, with each macro a referencing at least one effector, each macro having at least one argument;
the macros when executed, dynamically generating additional macros based on a state of a system after initialization has occurred; and
storing the additional macros in a non-volatile memory.

8. The method of claim 7 further comprising:
executing a second effector referred to by a second macro.

9. The method of claim 8 wherein:
the second macro located at the address following a first macro.

10. The method of claim 8 wherein:
executing the second effector includes accessing a set of arguments of the second macro.

11. The method of claim 8 further comprising:
executing a first effector in response to a reference to the first effector by a third macro, including accessing a set of arguments of the third macro.

12. A machine readable medium embodying instructions which, when executed by a processor, cause the processor to perform a method, the method comprising:
executing a basic input/output system (BIOS) having a set of effectors having executable code, and a set of macros, with each macro a referencing at least one effector, each macro having at least one argument;
the macros when executed, dynamically generating additional macros based on a state of a system after initialization has occurred; and storing the additional macros in a non-volatile memory.

13. The machine readable medium of claim 12 further embodying instructions which, when executed by the processor, cause the processor to perform the method further comprising:
executing a second effector referred to by a second macro.

14. The machine readable medium of claim 13 further embodying instructions which, when executed by the processor, cause the processor to perform the method wherein:
the second macro located at the address following a first macro.

15. The machine readable medium of claim 13 further embodying instructions which, when executed by the processor, cause the processor to perform the method further comprising:
executing the second effector includes accessing a set of arguments of the second macro.

16. The machine readable medium of claim 13 further embodying instructions which, when executed by the processor, cause the processor to perform the method further comprising:
executing the first effector in response to a reference to the first effector by a third macro, including accessing a set of arguments of the third macro.

17. A system comprising:
a processor;
a memory controller coupled to the processor;
a memory coupled to the memory controller;
a BIOS coupled to the processor, having a set of effectors having executable code, and a set of macros, with each macro a referencing at least one effector, each macro having at least one argument, the macros when executed dynamically generating additional macros based on a state of a system after initialization has occurred, the additional macros to be stored in a non-volatile memory.

* * * * *